June 2, 1925.
E. HOUDRY
1,540,734
LAMINATED SUSPENSION SPRING FOR AUTOMOBILES AND OTHER VEHICLES
Filed March 8, 1924
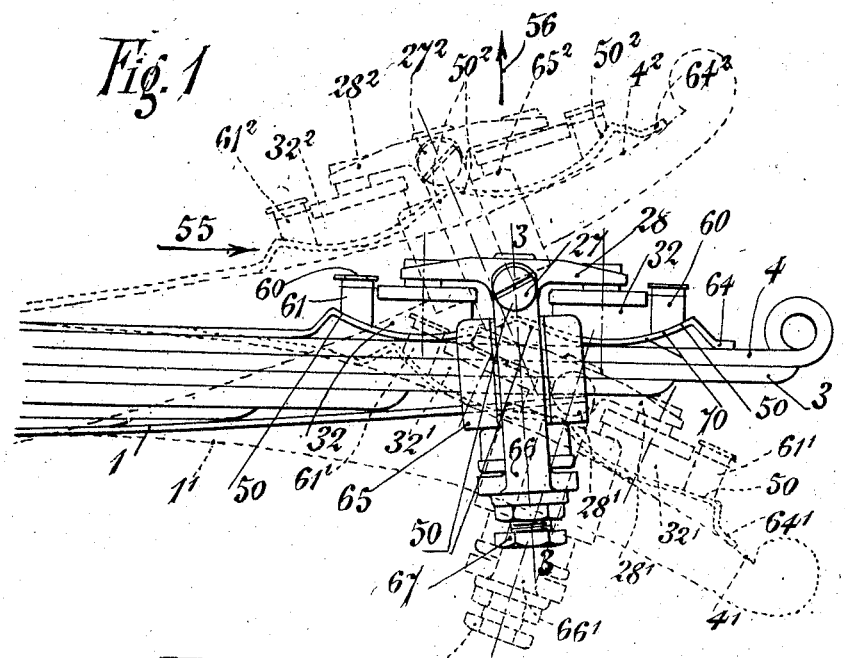
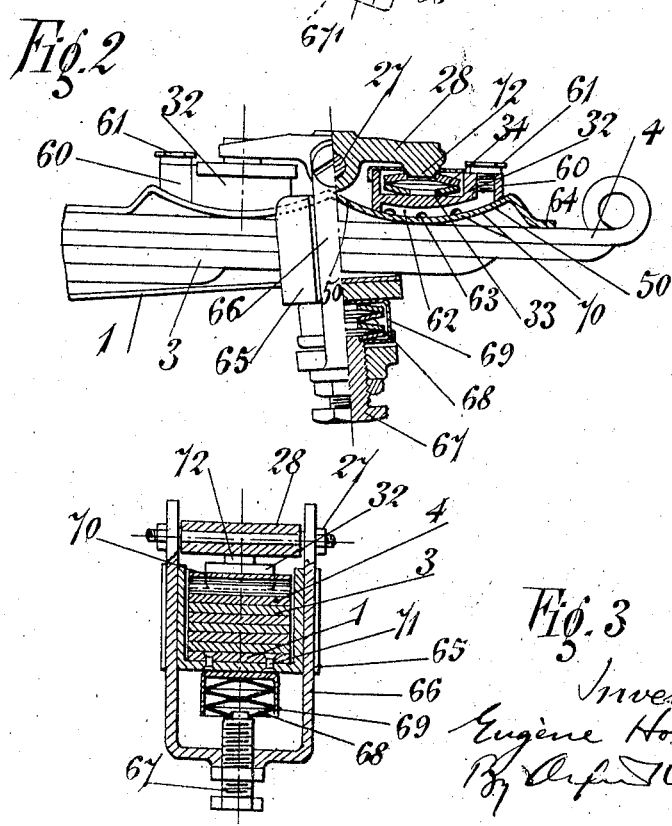

Patented June 2, 1925.

1,540,734

UNITED STATES PATENT OFFICE.

EUGÈNE HOUDRY, OF PARIS, FRANCE, ASSIGNOR TO MANUFACTURE GÉNÉRALE DE RESSORTS, OF PARIS, FRANCE, A LIMITED JOINT STOCK COMPANY OF FRANCE.

LAMINATED SUSPENSION SPRING FOR AUTOMOBILES AND OTHER VEHICLES.

Application filed March 8, 1924. Serial No. 697,689.

*To all whom it may concern:*

Be it known that I, EUGÈNE HOUDRY, citizen of the Republic of France, residing at Paris, France, have invented certain new and useful Improvements in Laminated Suspension Springs for Automobiles and Other Vehicles, of which the following is a specification.

My invention relates to various improvements in laminated springs and more particularly in springs having braking slippers.

One of the objects of the present invention is to retard the oscillation of the spring more efficiently and more gradually.

A further object is to provide means whereby the friction member carried by the slipper is maintained in constant contact with the spring itself during the entire oscillatory movement of the spring.

An embodiment of the invention is illustrated as an example in the accompanying drawing, in which:—

Fig. 1 is an elevation of a portion of a laminated spring constructed in accordance with this invention.

Fig. 2 is a view partly in elevation and partly in longitudinal section of the end of said spring.

Fig. 3 is a transverse section of the end of the spring on the line 3—3 of Fig. 1.

The shock reducing spring is formed of laminations 3 held between a main strip 4 and a counter strip 1.

A plate 64 supported by the strip 4 is formed of two parts 70 which are part cylindrical and concave looking from the exterior of the spring; each of these parts 70 thus forms two inclines 50 inclined in opposite direction to each other relatively to the main strip 4. The so-called braking arrangement comprises firstly a movable stirrup 66 sliding freely in a second stirrup 65 fixed permanently to the counter strip 1 by rivets 71 having bevelled heads.

The movable stirrup 66 is provided with a spindle 27 on which pivots a rocking lever 28 the ends of which have projections 72 engaging in resilient washer 33, 34 and compressing these washers in friction casings 32; to each casing 32 is attached a lubricating cup 60 closed by a threaded stopper 61. The internal channel 62 of this casing opens out on to the contact surface between the casing 32 and the raised strip 70; transverse channels 63 ensure regular and continuous distribution of the lubricant over the whole of this surface during the various displacements of the casings 32 relatively to the raised part 70.

The movable stirrup 66 has also a screw 67 provided with a tightening nut, the end of the screw being in engagement with resilient washers 68; these washers are superposed in a casing 69 mounted rigidly beneath the fixed stirrup 65.

The spring operates in the following manner when the end of the laminated spring is deformed on account of unevenness in the surface of the road assuming during its oscillation various positions as indicated in Fig. 1. The braking slipper formed by the combination of the two casings 32 and the rocking lever 28 is displaced in alternate directions relatively to the spring as shown by the arrow 55, and in a direction opposite to this arrow.

Each casing 32 therefore comes alternately into engagement with one or the other of the inclines 50 between which it is located; when one of the casings 32 rides up one of its corresponding inclines 50, the rocking lever 28 is inclined and exerts a force on the movable stirrup 66 as indicated by the arrow 56, and as a result this movable stirrup slides within the fixed stirrup 65 and further compresses the resilient washers 68 in their casing 69.

The relative displacements of the casings 32 on the inclines 50 cause considerable friction which dampen the oscillations of the spring.

Thus, a progressive braking of these oscillations is effected during each displacement of the slipper, either in the direction of the arrow 55 or in the opposite direction.

It may also be pointed out that the casings 32 remain strongly pressed by the washers 33, 34 against the raised part 70 along their entire base surface, whatever the amplitude of the oscillating movement of the spring is; this result is rendered possible by the fact that the whole arrangement formed by one casing 32 and two washers 33, 34 can turn freely relatively to the rocking lever 28 and assume any suitable inclination relatively to this lever as is shown in Fig. 1.

To ensure the regulation of the pressure exerted by the casings 32 on the raised part 70 and consequently on the main strip 4, it suffices to adjust in one or other direction the screw 67 within the movable stirrup 66, the end of this screw thus more or less compressing the resilient washers 68 in their casing 69; the reaction of these washers is transmitted to the rocking lever 28 by the spindle 27 and the movable stirrup 66.

I declare that what I claim is:—

1. In a laminated spring used in the suspension of automobiles and other vehicles, the combination with a main strip, and a counter strip, of a cap member carried by said counter strip, a rocking lever pivoted on the said cap member, and a friction member pivoted to each arm of the said rocking lever, and being in frictional contact with a part of the spring opposite said counter strip.

2. In a laminated spring for the suspension of automobiles and other vehicles, the combination is a main strip and a counter strip remote from said main strip, of a fixed stirrup carried by said counter strip, a movable stirrup sliding in said fixed stirrup, means to control the sliding of said movable stirrup in said fixed stirrup, a rocking lever pivoted on said movable stirrup, and friction members pivoted on said rocking lever and bearing on said main strip.

3. In a laminated spring for the suspension of automobiles or other vehicles, the combination with a main strip and a counter strip arranged on the side of said spring remote from said main strip, of a fixed stirrup carried by said counter strip, a movable stirrup sliding in said fixed stirrup, resilient members mounted within said fixed stirrup, a threaded pin screwed into said movable stirrup and compressing said resilient members against said fixed stirrup, a rocking lever pivoted on said movable stirrup, friction members pivoted on said rocking lever and bearing on said main strip.

4. In a laminated spring for the suspension of automobiles or other vehicles, the combination with a main strip and a counter strip, of remote from said main strip a cap member carried by said counter-strip, a rocking lever pivoted on said cap member, cup casings contacting frictionally with said main strip, resilient washers in said casings, and projecting members mounted on said lever and bearing against said washers.

5. In a laminated spring for the suspension of automobiles or other vehicles, the combination with a main strip and a counter strip, of remote from said main strip a cap-member carried by said counter-strip, a rocking lever pivoted on said cap member, friction members pivoted on said rock lever and frictioning on said main strip, and a lubricating cup attached to said friction member having a channel discharging on to the contact surface of said friction member with said main strip.

6. In a laminated spring for the suspension of automobiles or other vehicles, the combination with the spring, of a part forming a sharply inclined slope, a braking slipper frictionally bearing on said slope, and means connecting the said slipper with the spring, yet allowing the slipper to be displaced relative to the spring, and frictionally bear on said slope.

7. In a laminated spring for the suspension of automobiles and other vehicles, the combination with an upper spring plate having two oppositely sloping surfaces, a slipper inserted between said two slopes and adapted to friction alternately on them, and means to connect said slipper with said spring yet allowing said slipper to be displaced relatively to said spring and to frictionally bear on said slopes.

8. In a laminated spring for the suspension of automobiles or other vehicles, the combination of an element forming part of with the spring and having a cylindrical surface forming two oppositely sloping surfaces, a slipper and a friction member carried by said slipper and resting on said cylindrical surface, said member coming into contact alternately with one or other of said sloping surfaces.

9. In a laminated spring for the suspension of automobiles or other vehicles, the combination of a cap member carried by the spring, a rocking lever pivoted on said cap member, having two oppositely sloping surfaces and friction members pivoted on said rocking lever and bearing on one of said sloping surfaces.

In testimony whereof I affix my signature.

EUGÈNE HOUDRY.